(12) United States Patent
Zhou et al.

(10) Patent No.: US 12,116,317 B2
(45) Date of Patent: Oct. 15, 2024

(54) ALKALI-ACTIVATED GEOPOLYMER COATING, AND PREPARATION METHOD AND USE THEREOF

(71) Applicant: Shenzhen University, Shenzhen (CN)

(72) Inventors: Yingwu Zhou, Shenzhen (CN); Feng Xing, Shenzhen (CN); Wenhui Guo, Shenzhen (CN); Biao Hu, Shenzhen (CN); Menghuan Guo, Shenzhen (CN); Xiaoxu Huang, Shenzhen (CN); Zhongfeng Zhu, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 18/408,776

(22) Filed: Jan. 10, 2024

(65) Prior Publication Data
US 2024/0262747 A1    Aug. 8, 2024

(30) Foreign Application Priority Data

Jan. 10, 2023 (CN) .......................... 202310037130.1

(51) Int. Cl.
| | | |
|---|---|---|
| *C04B 28/00* | (2006.01) | |
| *C04B 14/04* | (2006.01) | |
| *C04B 14/30* | (2006.01) | |
| *C04B 16/04* | (2006.01) | |
| *C04B 22/06* | (2006.01) | |
| *C04B 24/42* | (2006.01) | |
| *C04B 40/00* | (2006.01) | |
| C04B 103/10 | (2006.01) | |
| C04B 103/30 | (2006.01) | |
| C04B 103/50 | (2006.01) | |

(52) U.S. Cl.
CPC .......... *C04B 28/006* (2013.01); *C04B 14/045* (2013.01); *C04B 14/305* (2013.01); *C04B 16/04* (2013.01); *C04B 22/062* (2013.01); *C04B 24/42* (2013.01); *C04B 40/0042* (2013.01); *C04B 2103/10* (2013.01); *C04B 2103/302* (2013.01); *C04B 2103/50* (2013.01)

(58) Field of Classification Search
CPC ..... C04B 28/006; C04B 22/062; C04B 24/42; C04B 14/305; C04B 16/04; C04B 40/0042; C04B 14/045
See application file for complete search history.

(56) References Cited

FOREIGN PATENT DOCUMENTS

| | | |
|---|---|---|
| CN | 106830798 A | 6/2017 |
| CN | 111499334 A | 8/2020 |

OTHER PUBLICATIONS

Zheng Guojuan; "Paints and varnishes—Pull-off test for adhesion"; Sep. 1, 2006.

(Continued)

*Primary Examiner* — John E Uselding
(74) *Attorney, Agent, or Firm* — Troutman Pepper Hamilton Sanders LLP; Christopher C. Close, Jr.

(57) ABSTRACT

Disclosed are an alkali-activated geopolymer coating, and a preparation method and use thereof. The alkali-activated geopolymer coating, is prepared by raw materials including the following components: an aluminosilicate mineral, an alkali activator, and a performance additive; wherein the aluminosilicate mineral comprises fly ash, slag, and metakaolin; the performance additive comprises a polymer powder, titanium dioxide, a silicone defoamer, and a water-reducing admixture; and a mass ratio of the aluminosilicate mineral, the alkali activator, and the performance additive is in a range of 100:(60-80):(4-15).

11 Claims, 11 Drawing Sheets

(56) References Cited

OTHER PUBLICATIONS

Zheng Guojuan; "Paints and varnishes—Determination of film hardness by pencil test"; Dec. 29, 2006.
Zhangyan et al.; "Corrosion tests in artificial atmospheres—salt spray tests"; Dec. 31, 2012.

ALKALI-ACTIVATED GEOPOLYMER COATING, AND PREPARATION METHOD AND USE THEREOF

CROSS REFERENCE TO RELATED APPLICATION

This patent application claims the benefit and priority of Chinese Patent Application No. 202310037130.1 filed with the China National Intellectual Property Administration on Jan. 10, 2023, and entitled with "ALKALI-ACTIVATED GEOPOLYMER COATING, AND PREPARATION METHOD AND USE THEREOF", the disclosure of which is incorporated by reference herein in its entirety as part of the present application.

TECHNICAL FIELD

The present disclosure belongs to the technical field of geopolymer materials, and specifically relates to an alkali-activated geopolymer coating, and a preparation method and use thereof.

BACKGROUND

Reinforced concrete, as the most widely used building material in the world, is widely used in the field of infrastructure construction. The material deterioration caused by the corrosion of steel bars is one of the important factors affecting the durability of reinforced concrete structures. In addition to the methods such as adding rust inhibitors, replacing ordinary steel bars with special steel bars, and taking electrochemical protection measures, protective coatings can also be used to extend the service life of buildings in harsh service environments. Moreover, the protective coating is relatively easy to apply during operation and can effectively reduce the maintenance costs throughout the life cycle of the building.

Hot-dip galvanized coating is widely used in the field of steel corrosion protection as an inorganic coating with desirable protective properties. However, zinc has a high metallic activity and is prone to react in the alkaline environment inside concrete, which affects the integrity of the coating and limits its further promotion and use as a steel bar coating. Inorganic enamel coatings with high protective properties require high-temperature calcination during their preparation, and there are certain limitations to their actual application and promotion. Traditional organic coatings (represented by polyurethane coatings, epoxy resin coatings, and acrylate coatings) benefit from their denseness and thus show excellent initial protective effects. However, the characteristics of the organic material itself as the main body of these coatings make the coatings prone to aging and poor weather resistance during use, which may affect the service life of the coatings. In addition, the organic coatings also have problems such as high emissions of volatile organic compounds (VOCs) and carbon dioxide during production and application, as well as easy damage during transportation. The interface in a system is a three-phase interface composed of steel bar, coating, and concrete. Organic coatings and concrete have different material properties, resulting in a bonding force between coated steel bars and concrete reduced by not less than 20% compared to that between bare steel bars and concrete. Steel bars are prone to slipping after being coated with the organic coatings, which can affect the cooperative performance of the steel bars and concrete. Inorganic alkali-activated coatings have a higher compatibility with concrete due to their inherent material properties. When being applied as a coating to steel bars, there is a better bonding force between the organic coatings and the concrete than that of the organic coatings. However, there is also a poor adhesive property between the inorganic alkali-activated coatings and the steel bars.

SUMMARY

In view of this, the present disclosure is to provide an alkali-activated geopolymer coating, and a preparation method and use thereof. In the present disclosure, the anti-rust coating prepared by the alkali-activated geopolymer coating with fly ash, slag, and metakaolin as a matrix, and a polymer powder, titanium dioxide, a silicone defoamer, and a water-reducing admixture as a performance additive exhibits desirable adhesion to steel bars.

To achieve the above objects, the present disclosure provides the following technical solutions:

The present disclosure provides an alkali-activated geopolymer coating, which is prepared by raw materials including the following components: an aluminosilicate mineral, an alkali activator, and a performance additive;
  wherein the aluminosilicate mineral includes fly ash, slag, and metakaolin;
  the performance additive includes a polymer powder, titanium dioxide, a silicone defoamer, and a water-reducing admixture; and
  a mass ratio of the aluminosilicate mineral, the alkali activator, and the performance additive is in a range of 100:(60-80):(4-15).

In some embodiments, a mass ratio of the fly ash, the slag, and the metakaolin in the aluminosilicate mineral is in a range of (40-60):(20-40):(10-30).

In some embodiments, a mass ratio of the polymer powder to the aluminosilicate mineral is in a range of (1-5):100.

In some embodiments, a mass ratio of the titanium dioxide to the aluminosilicate mineral is in a range of (3-8):100.

In some embodiments, an amount of the silicone defoamer accounts for 0.1% to 0.3% of a total mass of the aluminosilicate mineral and the alkali activator.

In some embodiments, a mass ratio of the water-reducing admixture to the aluminosilicate mineral is in a range of (0.5-1):100.

In some embodiments, the alkali activator is prepared from sodium silicate, sodium hydroxide, and water.

In some embodiments, the alkali activator has a modulus of 1.0 to 2.0.

The present disclosure further provides a method for preparing the alkali-activated geopolymer coating described in the above technical solutions, including:
  mixing the fly ash, the slag, the metakaolin, the polymer powder, and the titanium dioxide to obtain a mixed powder; and
  mixing the mixed powder, the alkali activator, and the silicone defoamer to obtain a mixture, and then mixing the mixture with the water-reducing admixture to obtain the alkali-activated geopolymer coating.

The present disclosure further provides use of the alkali-activated geopolymer coating described in the above technical solutions or an alkali-activated geopolymer coating prepared by the method described in the above technical solutions in rust protection of a steel bar, including: coating the alkali-activated geopolymer coating onto a surface of the steel bar to form an anti-rust coating.

The present disclosure provides an alkali-activated geopolymer coating, which is prepared by raw materials including the following components: an aluminosilicate mineral, an alkali activator, and a performance additive; wherein the aluminosilicate mineral includes fly ash, slag, and metakaolin; the performance additive includes a polymer powder, titanium dioxide, a silicone defoamer, and a water-reducing admixture; and a mass ratio of the aluminosilicate mineral, the alkali activator, and the performance additive is in a range of 100:(60-80):(4-15).

Compared with the prior art, the embodiments of the present disclosure have the following beneficial effects:

In the present disclosure, the alkali-activated geopolymer coating adopts fly ash, slag, and metakaolin as a matrix. The cracking of the coating can be reduced by adding the polymer powder, and the mechanical strength, substrate adhesion, and corrosion resistance of the coating can be improved by adding the titanium dioxide. A prepared antirust coating has high hardness, is not easy to be damaged, has desirable adhesion to steel bars, and exhibits excellent rust protection effect in an electric current-accelerated corrosion test.

Furthermore, in the present disclosure, industrial solid wastes fly ash and slag are used as raw materials to prepare the alkali-activated geopolymer coating, which has lower carbon emission and is more friendly to the environment. Accordingly, there is a development potential for the alkali-activated geopolymer coating according to the present disclosure as an inorganic and green steel bar coating.

The present disclosure further provides use of the alkali-activated geopolymer coating in rust protection of a steel bar, including: coating the alkali-activated geopolymer coating onto a surface of the steel bar to form an anti-rust coating. In the present disclosure, the alkali-activated geopolymer coating contains an alkali activator, which is alkaline and helps to maintain the stability of the passivation film on the surface of the steel bars, thereby showing a protective effect on the steel bars inside the coating. The alkali-activated geopolymer coating contains slag, with a main hydration product of C-(A)-S-H. When the steel bar containing the coating is applied in concrete, there is a high compatibility with Portland cement in the concrete and a desirable adhesion at the interface between the coating and the concrete. The data in the examples prove that when a small amount of pitting corrosion occurs in the coated steel bars, the remaining uncorroded parts are not affected, indicating that the coating provided by the present disclosure has a desirable bonding effect with steel bars and can effectively delay the corrosion even if the coating is damaged. Therefore, the steel bar coating provided by the present disclosure is an inorganic protective coating that not only has a protective function, but also can reduce a decrease in the bonding force between the coated steel bars and concrete.

BRIEF DESCRIPTION OF THE DRAWINGS

To illustrate the technical solutions in the embodiments of the present disclosure or in the prior art more clearly, the drawings required in the embodiments will be briefly described below. Apparently, the drawings described below are merely some embodiments of the present disclosure, and other drawings can be obtained from these drawings by those of ordinary skill in the art without creative efforts.

DETAILED DESCRIPTION OF THE EMBODIMENTS

The present disclosure provides an alkali-activated geopolymer coating, which is prepared by raw materials including the following components: an aluminosilicate mineral, an alkali activator, and a performance additive; wherein
  the aluminosilicate mineral includes fly ash, slag, and metakaolin;
  the performance additive includes a polymer powder, titanium dioxide, a silicone defoamer, and a water-reducing admixture; and
  a mass ratio of the aluminosilicate mineral, the alkali activator, and the performance additive is in a range of 100:(60-80):(5-15).

In the present disclosure, unless otherwise specified, all materials and equipment used are commercially available items in the art.

In some embodiments of the present disclosure, a mass ratio of the fly ash, the slag, and the metakaolin in the aluminosilicate mineral is in a range of (40-60):(20-40):(10-30), preferably (50-60):(25-30):(15-25), and more preferably 50:30:20. The coating prepared by the coating obtained with the above mass ratio can meet the corrosion protection requirements on the premise of ensuring the construction performance.

In some embodiments of the present disclosure, the fly ash is low-calcium fly ash, the slag is high-calcium slag, and the metakaolin is high-activity metakaolin obtained after the calcination of kaolin. There are no special requirements on the sources of fly ash, slag, and metakaolin, and the materials commonly used in the building materials industry can be used. In some embodiments, the fly ash, slag, and metakaolin are derived from industrial solid waste to solve the problem of industrial waste piling up occupying land and polluting the environment, thereby realizing the resource utilization of industrial solid waste to meet the requirements of low-carbon and environmental protection.

In the present disclosure, the aluminosilicate mineral reacts with the alkali activator. The active silicon-aluminum components in the aluminosilicate mineral can undergo three-stage reactions of depolymerization, reorganization, and condensation polymerization to generate a new hydration product, forming a matrix of an alkali-activated geopolymer coating. The alkali-activated geopolymer coating is an inorganic coating.

In some embodiments of the present disclosure, the alkali activator is prepared from sodium silicate, sodium hydroxide, and water.

In some embodiments of the present disclosure, a mass ratio of the sodium silicate, the sodium hydroxide, and the water is 40:2.5:27.5.

In some embodiments of the present disclosure, the alkali activator is prepared by a process including the following steps: mixing the sodium hydroxide, the water, and the sodium silicate to obtain a mixture, and subjecting the mixture to cooling and aging in sequence to obtain the alkali activator.

In some embodiments of the present disclosure, the mixing is conducted by stirring. There are no special requirements on the stirring speed and time, as long as the components could be stirred uniformly.

In some embodiments of the present disclosure, the cooling is conducted until the temperature reaches room temperature.

In some embodiments of the present disclosure, the aging is conducted for 24 h.

In some embodiments of the present disclosure, the sodium silicate is used in the form of a sodium silicate solution; the sodium silicate solution is a sodium silicate aqueous solution, and the sodium silicate aqueous solution has a solid content of 35% to 45%, and preferably 43.96%. The sodium silicate serves as a main component of the alkali activator.

In some embodiments of the present disclosure, the sodium hydroxide is a pure sodium hydroxide solid. The sodium hydroxide can adjust the modulus and the alkali equivalent of the alkali activator, and the alkali equivalent refers to a mass of sodium oxide in the alkali activator. When the mass of the sodium silicate remains unchanged, an added amount of the sodium hydroxide increases, and the obtained alkali activator has a reduced modulus and an increased alkali equivalent.

In some embodiments of the present disclosure, the water is deionized water. The water can dissolve sodium hydroxide, thereby facilitating mixing with the sodium silicate, and adjusting an overall water content of the coating.

In some embodiments of the present disclosure, amass ratio of the water in the alkali activator to the aluminosilicate mineral is in a range of (0.4-0.7):1, and the water in the alkali activator includes the water in the sodium silicate and the added water.

In some embodiments of the present disclosure, a water content in the alkali activator is adjusted according to different coating modes of the coating. The coating mode includes dipping, brushing, or spraying. In some embodiments, when the coating mode is the dipping and brushing, there are low requirements on fluidity and viscosity of a coating slurry, and a mass ratio of the water in the alkali activator to the aluminosilicate mineral is in a range of (0.4-0.5):1. In some embodiments, when the coating method is the spraying, there are higher requirements on the fluidity and viscosity of the coating slurry, and a mass ratio of the water in the alkali activator to the aluminosilicate mineral is in a range of (0.6-0.7):1. In this way, the construction requirements for spraying can be met.

In some embodiments of the present disclosure, a mass ratio of the sodium oxide in the alkali activator to the aluminosilicate mineral is in a range of (6-10):100. The sodium oxide in the alkali activator includes sodium oxide in the sodium silicate and the corresponding sodium oxide obtained by converting the sodium hydroxide.

In some embodiments of the present disclosure, the alkali activator has a modulus of 1.0 to 2.0, and preferably 1.5.

In some embodiments of the present disclosure, the polymer powder is a redispersible polymer powder; and the redispersible polymer powder includes one or more selected from the group consisting of polyvinyl acetate, polypropylene, and polyvinyl alcohol. The redispersible polymer powder can toughen and modify the coating, thereby reducing the cracking of the coating.

In some embodiments of the present disclosure, a mass ratio of the polymer powder to the aluminosilicate mineral is in a range of (1-5):100, preferably (2-4):100, and more preferably 3:100.

In some embodiments of the present disclosure, the titanium dioxide is a titanium dioxide powder for architectural coatings having a main component of rutile titanium dioxide. The titanium dioxide can improve the mechanical strength, substrate adhesion, and corrosion resistance of the coating.

In some embodiments of the present disclosure, a mass ratio of the titanium dioxide to the aluminosilicate mineral is in a range of (3-8):100, and preferably (3-5):100.

In the present disclosure, the silicone defoamer has a main active ingredient of polyoxysilane, which can reduce the generation of bubbles during the preparation of the coating.

In some embodiments of the present disclosure, an amount of the silicone defoamer accounts for 0.1% to 0.3%, and preferably 0.22% of a total mass of the aluminosilicate mineral and the alkali activator.

In some embodiments of the present disclosure, the water-reducing admixture is a water-reducing admixture for concrete, and preferably a naphthalene-based water-reducing admixture. The water-reducing admixture can adjust the fluidity of the coating slurry to improve the construction performance.

In some embodiments of the present disclosure, a mass ratio of the water-reducing admixture to the aluminosilicate mineral is in a range of (0.5-1):100, and preferably (0.7-0.8):100.

In some embodiments of the present disclosure, a mass ratio of the aluminosilicate mineral, the alkali activator, and the performance additive is in a range of 100:(60-80):(4-15), preferably 100:70:(4.87-11.07), and more preferably 100:70:(7.87-9.89).

The present disclosure further provides a method for preparing the alkali-activated geopolymer coating described in the above technical solutions, including:

mixing the fly ash, the slag, the metakaolin, the polymer powder, and the titanium dioxide to obtain a mixed powder; and mixing the mixed powder, the alkali activator, and the silicone defoamer to obtain a mixture, and then mixing the mixture with the water-reducing admixture to obtain the alkali-activated geopolymer coating.

In the present disclosure, the fly ash, the slag, the metakaolin, the polymer powder, and the titanium dioxide are mixed to obtain a mixed powder.

There are no special requirements on the mixing method and time, as long as the mixed powder could be uniformly dispersed.

In the present disclosure, after obtaining the mixed powder, the mixed powder, the alkali activator, and the silicone defoamer are mixed to obtain a mixture, and then the mixture is mixed with the water-reducing admixture to obtain the alkali-activated geopolymer coating (coating slurry).

In some embodiments of the present disclosure, the silicone defoamer is pre-dissolved in water to ensure its uniform dispersion during the mixing; and the water is taken from the water in the alkali activator.

In some embodiments of the present disclosure, the mixing of the mixed powder, the alkali activator, and the silicone defoamer is conducted by low-speed stirring; the low-speed stirring is conducted at a revolution speed of 57 r/min to 67 r/min and a rotation speed of 135 r/min to 145 r/min; and the low-speed stirring is conducted for 1 min to 2 min. The low-speed stirring can avoid the problem of the powder rising caused by excessively high stirring speed.

In some embodiments of the present disclosure, the mixing of the mixture with the water-reducing admixture is conducted by high-speed stirring; the high-speed stirring is conducted at a revolution speed of 115 r/min to 125 r/min and a rotation speed of 275 r/min to 295 r/min; and the high-speed stirring is conducted for 2 min to 3 min.

In some embodiments of the present disclosure, after mixing the mixture with the water-reducing admixture, the method further includes eliminating residual air bubbles to obtain the alkali-activated geopolymer coating.

The present disclosure further provides use of the alkali-activated geopolymer coating described in the above technical solutions or an alkali-activated geopolymer coating prepared by the method described above in rust protection of a steel bar, including: coating the alkali-activated geopolymer coating onto a surface of the steel bar to form an anti-rust coating.

In some embodiments of the present disclosure, the coating is conducted by a mode selected from the group consisting of dipping, brushing, and spraying.

In some embodiments the present disclosure, after the coating is completed, the method further includes curing the anti-rust coating.

In some embodiments of the present disclosure, the curing is conducted by standard environmental curing or short-term high-temperature curing; the standard environmental curing includes parameters: a curing temperature of 25° C.±0.5° C., a relative humidity of 95%±5%, and a curing time of 7 days; the short-term high-temperature curing is conducted by a process includes: curing the anti-rust coating for 18 h±0.5 h at a temperature of 60° C.±0.5° C. with a relative humidity of 95%±5%, and then transferring to the room temperature environment for curing for 7 days. In some embodiments, when the curing is conducted by short-term high-temperature curing, coated steel bars are covered with a film oating, and then the film coating is subjected to short-term high-temperature curing. The film coating can prevent moisture from dissipating too quickly. The early short-term high-temperature curing in the short-term high-temperature curing helps the alkali-activated reaction to proceed.

In the present disclosure, the steel bars having the alkali-activated geopolymer coating are subjected to an electric current-accelerated corrosion test, and a resulting anti-rust coating shows desirable corrosion protection effects. The data in the examples prove that when a small amount of pitting corrosion occurs in the coated steel bars, the remaining uncorroded parts are not affected, indicating that the coating provided by the present disclosure has a desirable bonding effect with steel bars and can effectively delay the corrosion even if the coating is damaged.

To further illustrate the present disclosure, the alkali-activated geopolymer coating, and the preparation method and use thereof provided by the present disclosure will be described in detail below with reference to the drawings and examples, but they should not be constructed as limiting to the scope of the present disclosure.

The sodium silicate used in the examples and the comparative example is a commercially available industrial sodium silicate aqueous solution with a modulus of 2.0, including sodium oxide ($Na_2O$) with a mass content of 14.95%, silicon dioxide ($SiO_2$) with a mass content of 29.01%, a solid content of 43.96%, and water as the remaining main component.

Example 1

1) 50 parts of fly ash, 30 parts of slag, 20 parts of metakaolin, 2 parts of a redispersible polymer powder, 5 parts of titanium dioxide, 40 parts of sodium silicate, 2.5 parts of sodium hydroxide, 27.5 parts of deionized water, 0.37 parts of a silicone defoamer, and 0.5 parts of a naphthalene-based water-reducing admixture were weighed in parts by mass.

2) The sodium hydroxide and the deionized water were added to the sodium silicate. A resulting mixture was stirred evenly, cooled to a room temperature, and aged for 24 h to obtain an alkali activator with a modulus of 1.5.

3) The fly ash, the slag, the metakaolin, the redispersible polymer powder, and the titanium dioxide were thoroughly mixed, and then put into a stirring vessel. The alkali activator obtained in step 2) and the silicone defoamer were added to the vessel, and then a resulting mixture was stirred at a low speed for 2 min with revolution and rotation speeds of a stirring blade were 62 r/min±5 r/min and 140 r/min±5 r/min, respectively. The naphthalene-based water-reducing admixture was added thereto. A resulting mixture was stirred at a high speed for 3 min wth revolution and rotation speeds of the stirring blade were 125 r/min±10 r/min and 285 r/min±10 r/min, respectively to obtain an alkali-activated geopolymer coating.

Example 2

This example differed from Example 1 in that: in 1): 50 parts of fly ash, 30 parts of slag, 20 parts of metakaolin, 1 part of a redispersible polymer powder, 3 parts of titanium dioxide, 40 parts of sodium silicate, 2.5 parts of sodium hydroxide, 27.5 parts of deionized water, 0.37 parts of a silicone defoamer, and 0.5 parts of a naphthalene-based water-reducing admixture were weighed in parts by mass.

Example 3

This example differed from Example 1 in that: in 1): 60 parts of fly ash, 25 parts of slag, 15 parts of metakaolin, 2 parts of a redispersible polymer powder, 8 parts of titanium dioxide, 40 parts of sodium silicate, 2.5 parts of sodium hydroxide, 27.5 parts of deionized water, 0.37 parts of a silicone defoamer, and 0.7 parts of a naphthalene-based water-reducing admixture were weighed in parts by mass.

Example 4

This example differed from Example 1 in that: in 1): 40 parts of fly ash, 30 parts of slag, 30 parts of metakaolin, 4 parts of a redispersible polymer powder, 5 parts of titanium dioxide, 40 parts of sodium silicate, 2.5 parts of sodium hydroxide, 27.5 parts of deionized water, 0.39 parts of a silicone defoamer, and 0.5 parts of a naphthalene-based water-reducing admixture were weighed in parts by mass.

Example 5

This example differed from Example 1 in that: in 1): 50 parts of fly ash, 25 parts of slag, 25 parts of metakaolin, 3 parts of a redispersible polymer powder, 5 parts of titanium dioxide, 40 parts of sodium silicate, 2.5 parts of sodium hydroxide, 27.5 parts of deionized water, 0.36 parts of a silicone defoamer, and 0.8 parts of a naphthalene-based water-reducing admixture were weighed in parts by mass.

Comparative Example 1) 50 parts of fly ash, 30 parts of slag, 20 parts of metakaolin, 40 parts of sodium silicate, 2.5 parts of sodium hydroxide, 27.5 parts of deionized water, 0.37 parts of a silicone defoamer, and 0.5 parts of a naphthalene-based water-reducing admixture were weighed in parts by mass.

2) The sodium hydroxide and the deionized water were added in the sodium silicate. A resulting mixture was stirred evenly, cooled to a room temperature, and then aged for 24 h to obtain an alkali activator with a modulus of 1.5.

3) The fly ash, the slag, and the metakaolin were thoroughly mixed, and then put into a stirring vessel. The alkali activator obtained in step 2) and the silicone defoamer were added to the vessel, and then a resulting mixture was stirred at a low speed for 2 min with revolution and rotation speeds of a stirring blade were 62 r/min±5 r/min and 140 r/min±5 r/min, respectively. The naphthalene-based water-reducing admixture was added thereto. A resulting mixture was stirred at a high speed for 3 min with revolution and rotation speeds of the stirring blade were 125 r/min±10 r/min and 285 r/min±10 r/min, respectively to obtain an alkali-activated geopolymer coating.

Use Example 1

In the test, ordinary HRB400 steel bars with a diameter of 10 mm for construction were used, which were pre-polished to remove floating rust and oxide layers on their surface and then weighed.

The coatings prepared in Examples 1 to 5 were applied to the surface of the steel bars separately. The coatings prepared in Examples 1 and 3 to 5 were applied by brushing, while the coating prepared in Example 2 was applied by dipping. After curing, obtained coating films were separately transferred to a 60° C. oven to allow curing for 18 h, and then taken out and placed in the room temperature environment to allow continued curing for 7 days, so as to obtain the coated steel bars (steel bar coatings) of Examples 1 to 5, respectively. The coating prepared in the Comparative Example was applied to the surface of the steel bars by brushing. After curing, an obtained coating film was transferred to a 60° C. oven to allow curing for 18 h, and then taken out and placed in the room temperature environment to allow continued curing for 7 days, so as to obtain the coated steel bar of the Comparative Example (steel bar coating).

The coated steel bars and the uncoated steel bars were subjected to an electric current-accelerated corrosion test.

Figure 1:
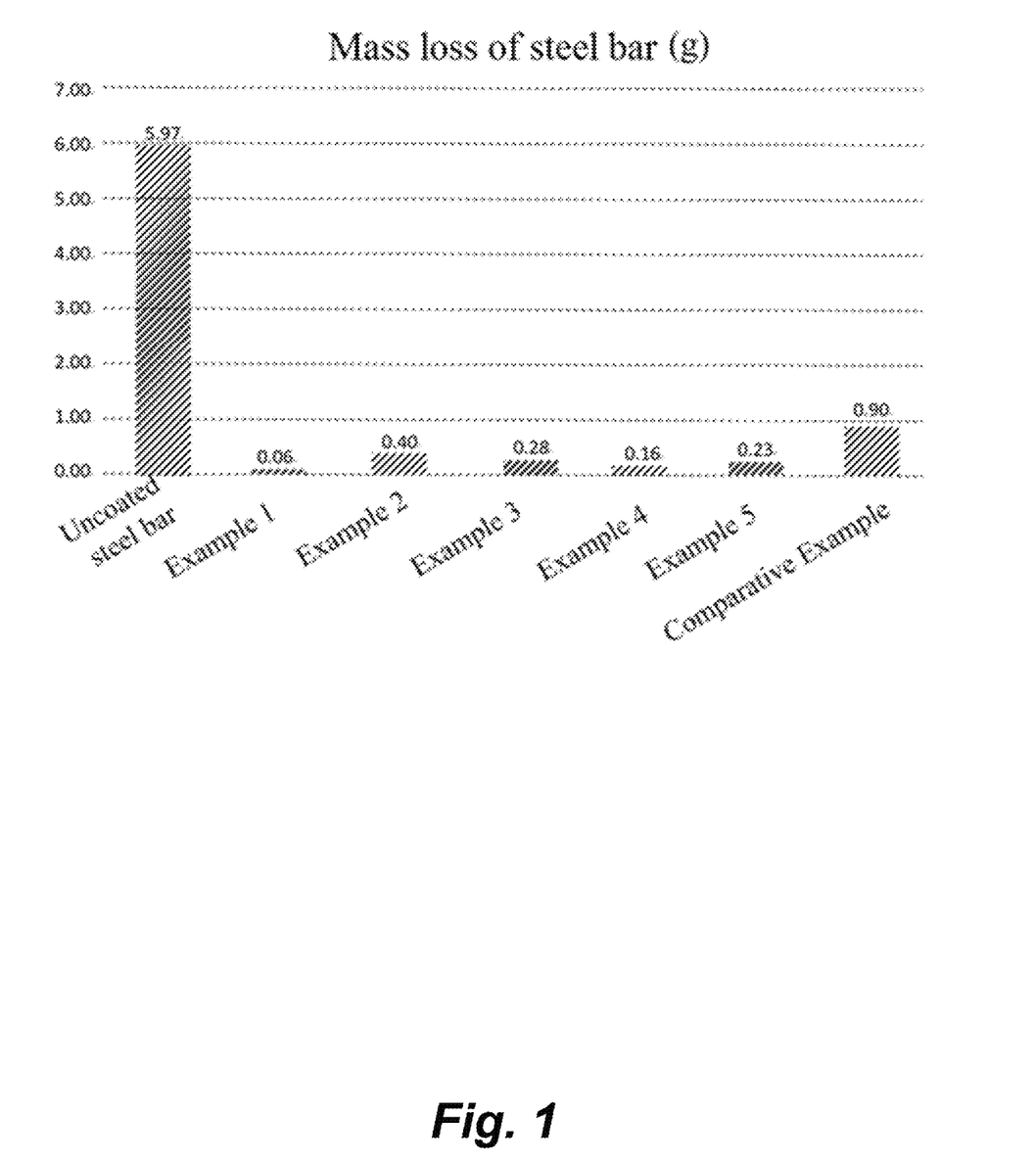
FIG. 1 is a statistical graph showing the steel bar mass loss during the electric current-accelerated corrosion test on Examples 1 to 5, Comparative Example, and an uncoated steel bar.

An exposed section length of the coated steel bar was controlled to 50 mm to allow the electric current-accelerated corrosion test to be carried out at 1.5 V for 48 h, where the salt solution in an energizing device was a 3.5 wt % sodium chloride solution. After the electrification was completed, rust products and residual coating were removed from the surface of the steel bars. The steel bar samples were pickled, dried, and weighed, and a mass loss was calculated. The results are shown in Table 1. FIG. 1 is a statistical graph showing the steel bar mass loss during the electric current-accelerated corrosion test on Examples 1 to 5, Comparative Example, and the uncoated steel bar.

Table 1 Mass loss of the coated steel bars in Examples 1 to 5 and Comparative Example and an uncoated steel bar during electric current-accelerated corrosion test

| Group | Example 1 | Example 2 | Example 3 | Example 4 | Example 5 | Comparative Example | Uncoated steel bar |
|---|---|---|---|---|---|---|---|
| Steel bar mass loss (g) | 0.06 | 0.40 | 0.28 | 0.16 | 0.23 | 0.90 | 5.97 |

Figure 2:
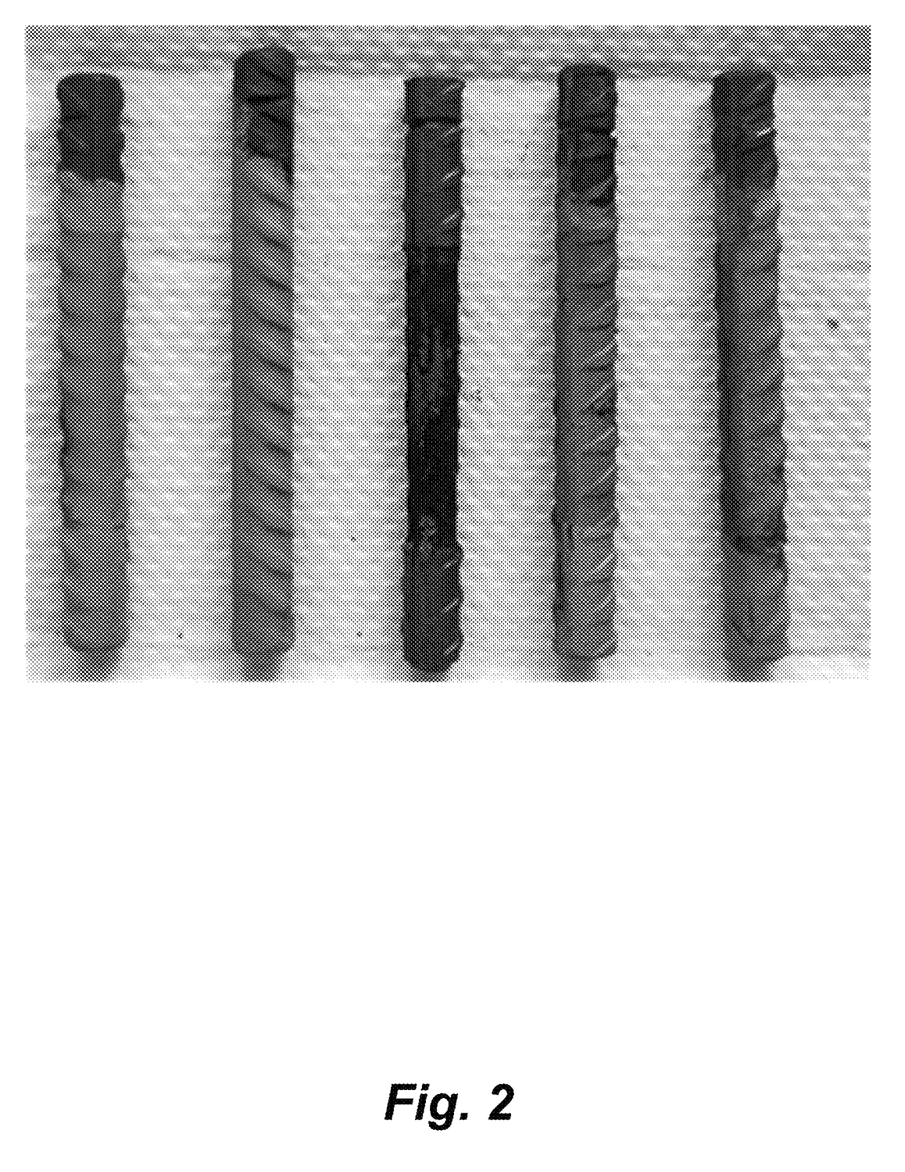
FIG. 2 shows an object picture of the coated steel bars and an uncoated steel bar after electric current-accelerated corrosion for 48 h, wherein the first on the left represents the coated steel bar of Example 2, the second on the left represents the coated steel bar of Example 1, the third on the left represents the uncoated steel bar, and the first and second on the right both represent the coated steel bar of the Comparative Example.

FIG. 2 shows an object picture of the coated steel bars and an uncoated steel bar after electric current-accelerated corrosion for 48 h, wherein the first on the left represents the coated steel bar of Example 2, the second on the left represents the coated steel bar of Example 1, the third on the left represents the uncoated steel bar, and the first and second on the right both represent the coated steel bar of the Comparative Example. Under the same corrosion conditions, the steel bar of Example 1 has the least generation of rust products and the lowest mass loss, which is only 1% of that of the uncoated steel bar. This indicates that the coating of Example 1 has a better protective effect.

Figure 3:
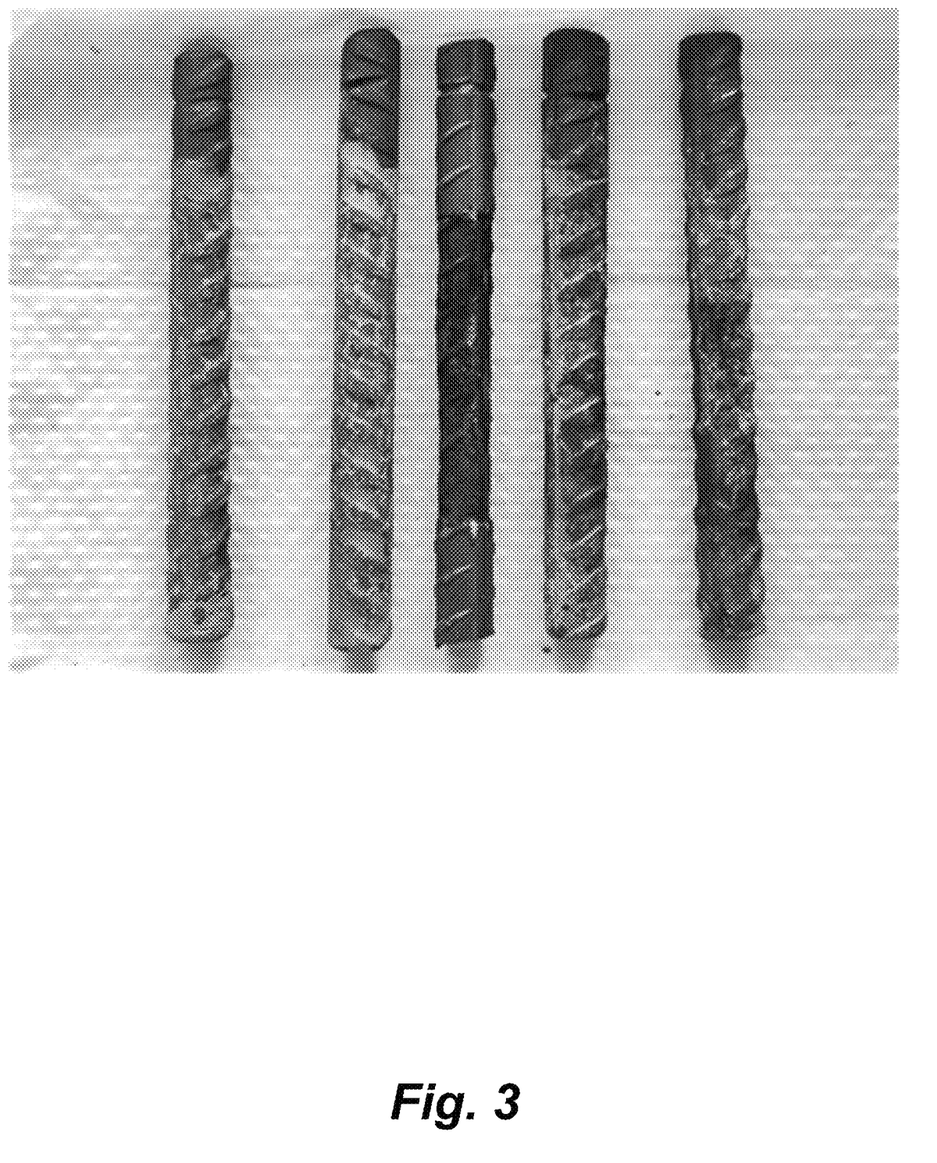
FIG. 3 shows a topographic image of the steel bars in FIG. 2 after removing the surface coatings.

FIG. 3 shows a topographic image of the steel bars in FIG. 2 after removing the surface coatings.

Figure 4:
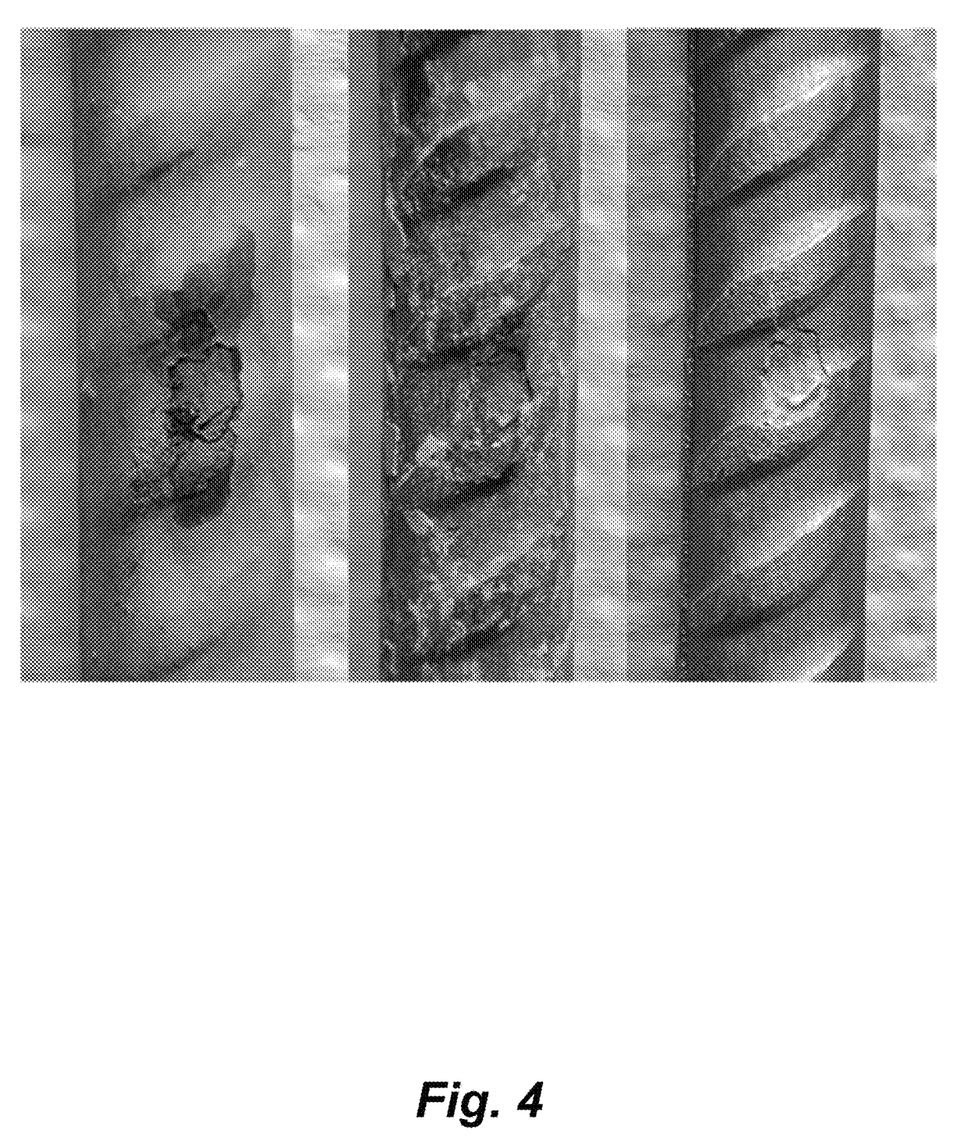
FIG. 4 shows an object picture of the coated steel bars of Example 1 after electric current-accelerated corrosion for 48 h, wherein there are the object picture of an uncoated steel bar, the object picture of the steel bar after removing the coating, and the object picture of the pickled steel bar from left to right in sequence.

FIG. 4 shows an object picture of the coated steel bars of Example 1 after electric current-accelerated corrosion for 48 h, wherein there are the object picture of an uncoated steel bar, the object picture of the steel bar after removing the coating, and the object picture of the pickled steel bar from left to right in sequence. It can be seen that when a small amount of pitting corrosion occurs in the coated steel bars, the remaining uncorroded parts are not affected, indicating that the coating of the present disclosure has a desirable bonding effect with steel bars and can effectively delay the corrosion even when the coating is damaged. When steel bars corrode, a volume of the corrosion products produced increases much more than that of the original composition in the steel bars. If there is a poor bonding effect between the coating and the steel bar, the stress caused by volume expansion of the corrosion products of the steel bar may be greater than the bonding force between the coating and the matrix, causing the coating and the matrix to separate. This then forms under-film corrosion between the coating and the matrix, causing the corrosion to continue to expand on the surface of the steel bar. No under-film corrosion occurs in the coated steel bars of Example 1, indicating that there is a desirable bonding force between the coating and the steel bar matrix. Since the surface of ribbed steel bars is curved and uneven, there is no particularly suitable way to measure the bonding force with the coating. Therefore, the 7-day adhesion between the coating and a steel plate was tested with reference to GB/T 5210-2016 "Paints and varnishes—Pull-off test for adhesion". The coating prepared in Example 1 has a bonding force of 2.17 MPa, the coating prepared in Example 2 has a bonding force of 1.67 MPa, the coating prepared in Example 3 has a bonding force of 2.05 MPa, the coating prepared in Example 4 has a bonding force of 1.93 MPa, the coating prepared in Example 5 has a bonding force of 1.79 MPa, and the coating prepared in the Comparative Example has a bonding force of 1.5 MPa.

Figure 5:
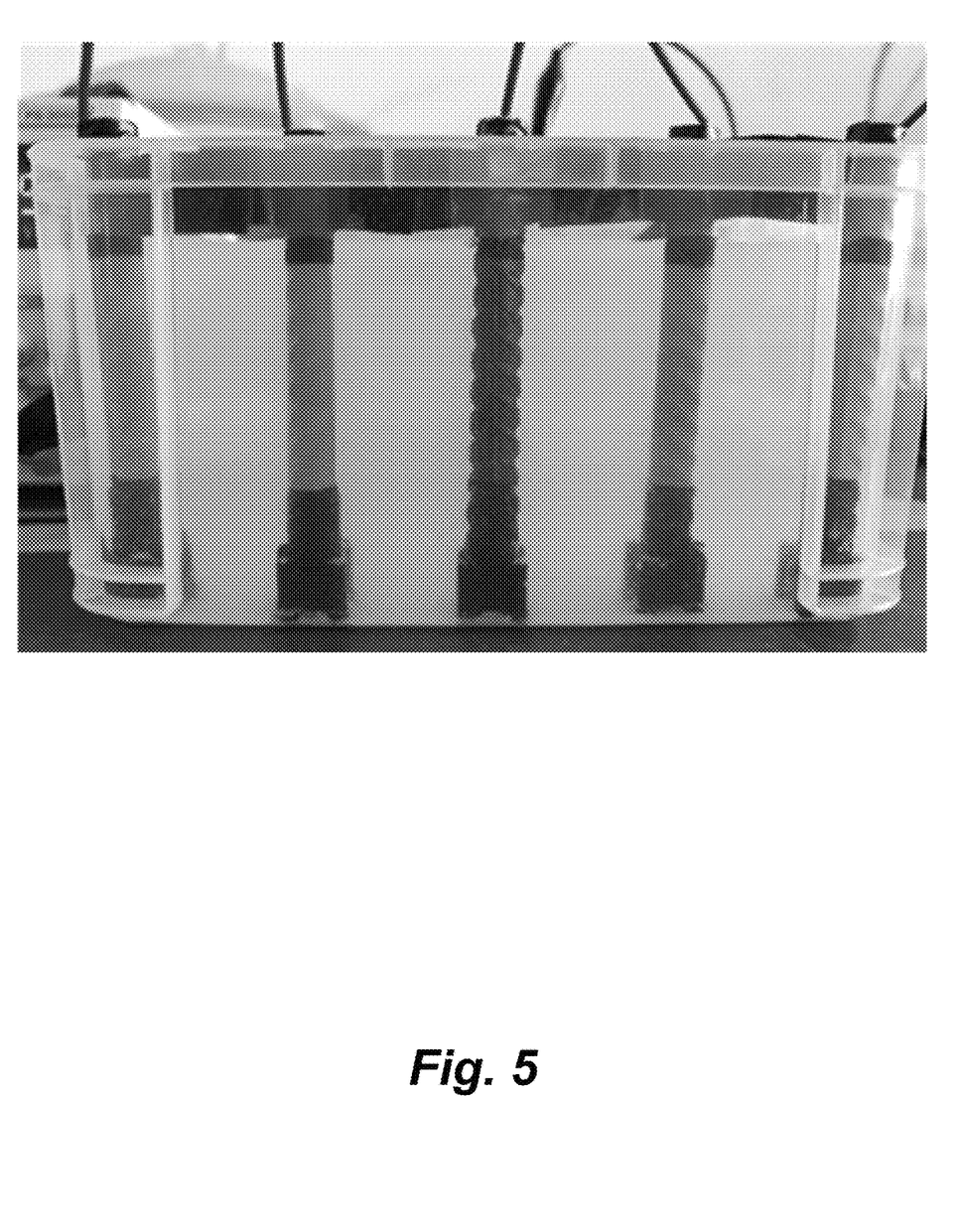
FIG. 5 shows an object picture of the coated steel bars of Example 1 and an uncoated steel bar before electric current-accelerated corrosion, wherein the middle steel bar is the uncoated steel bar, and the rest are the coated steel bars of Example 1.
Figure 6:
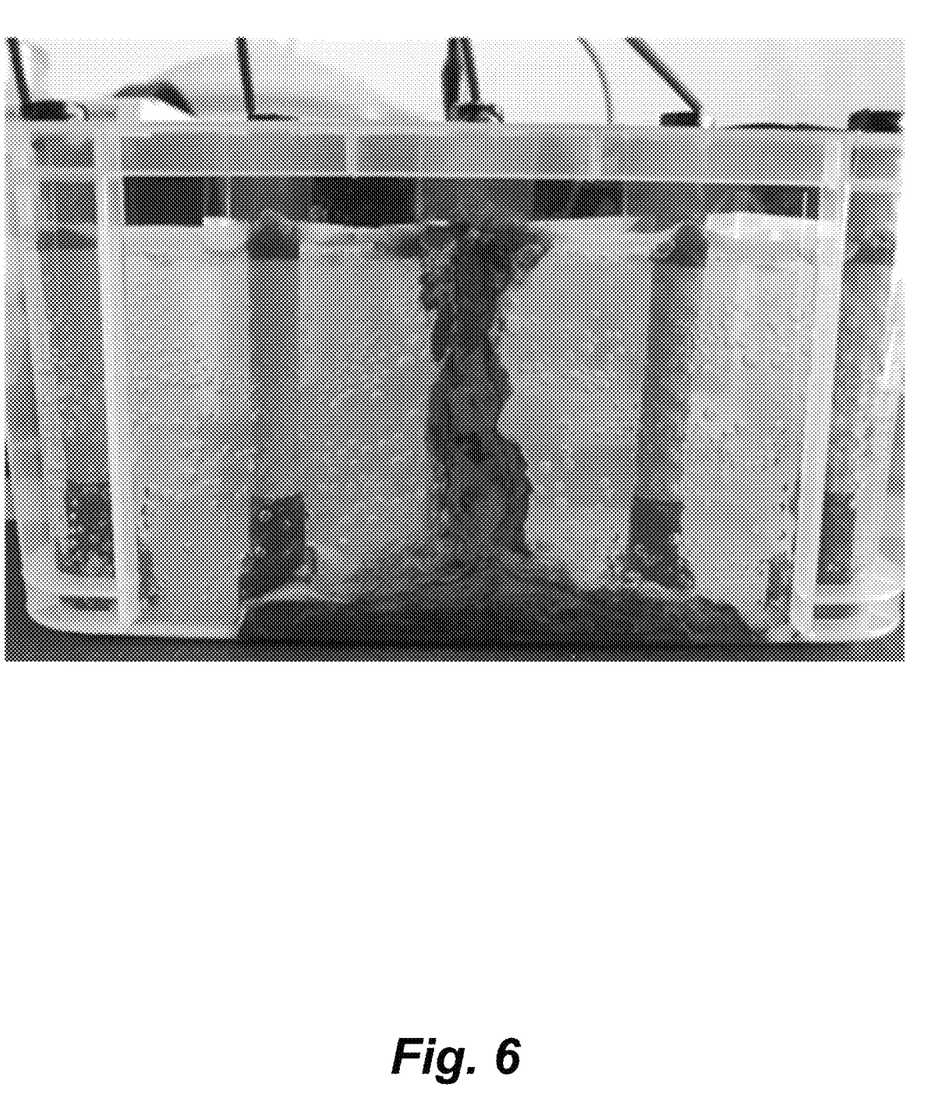
FIG. 6 shows an object picture of the steel bars in FIG. 5 after electric current-accelerated corrosion for 48 h.
Figure 7:
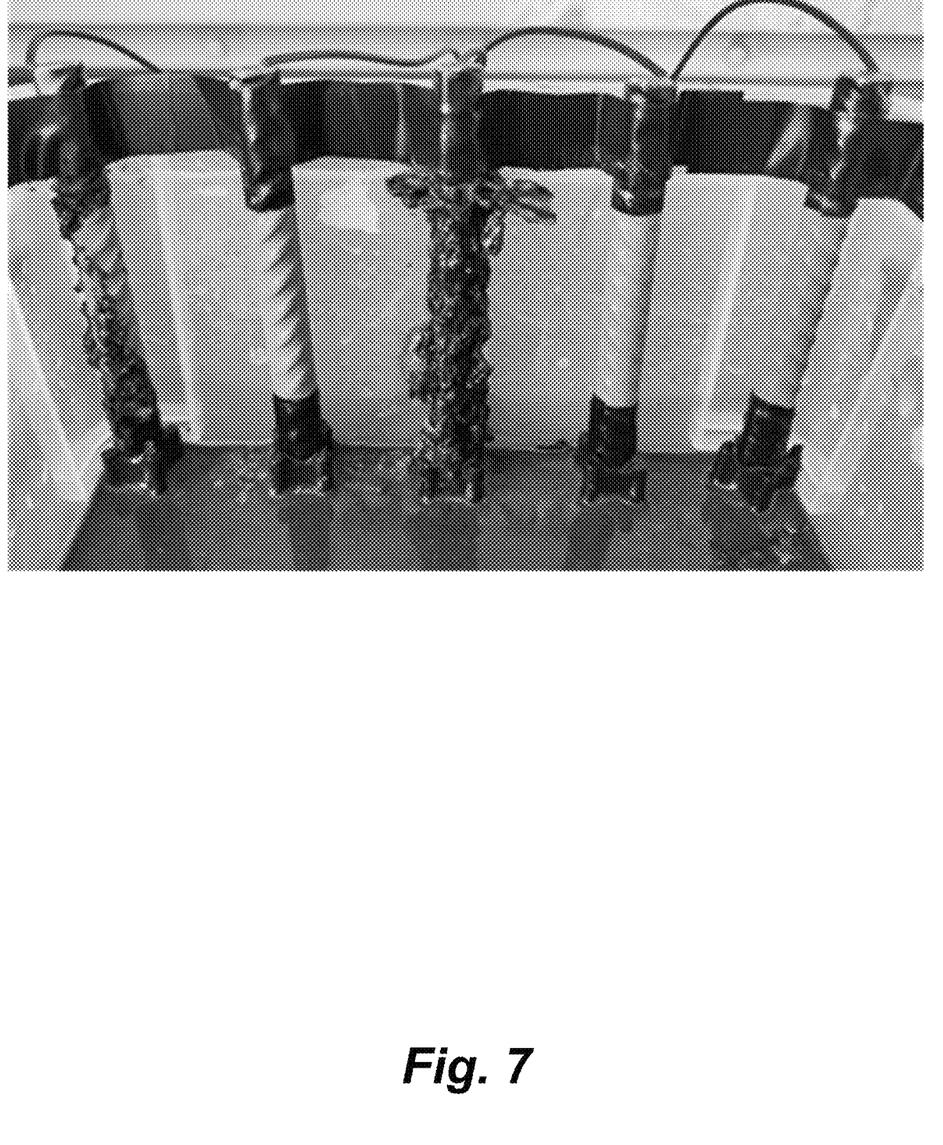
FIG. 7 shows an object picture of the coated steel bars of Example 1 and the uncoated steel bar in FIG. 6.

FIG. 5 shows an object picture of the coated steel bars in Example 1 and an uncoated steel bar before electric current-accelerated corrosion, wherein the middle steel bar is the uncoated steel bar, and the rest are the coated steel bars in Example 1. FIG. 6 shows an object picture of the steel bars in FIG. 5 after electric current-accelerated corrosion for 48 h. FIG. 7 shows an object picture of the coated steel bars of Example 1 and the uncoated steel bars in FIG. 6. It can be seen that the surface of the uncoated steel bars has been completely covered by corrosion products, while only a small amount of corrosion occurs in the coated steel bar on the left 1 of Example 1, and no corrosion is observed in the remaining samples.

The alkali-activated geopolymer coating provided by the present disclosure was prepared as a protective coating for steel bars. The coating had high hardness and was not easily damaged. After testing according to GB/T 6739-2006 "Paints and varnishes—Determination of film hardness by pencil test", the pencil hardness grade of the steel bar coatings in Examples 1 to 5 were all 6H, showing high corrosion protection effect in the electric current-accelerated corrosion test. In comparison, the steel bar coating of the Comparative Example had a pencil hardness rating of 3H.

Figure 8:
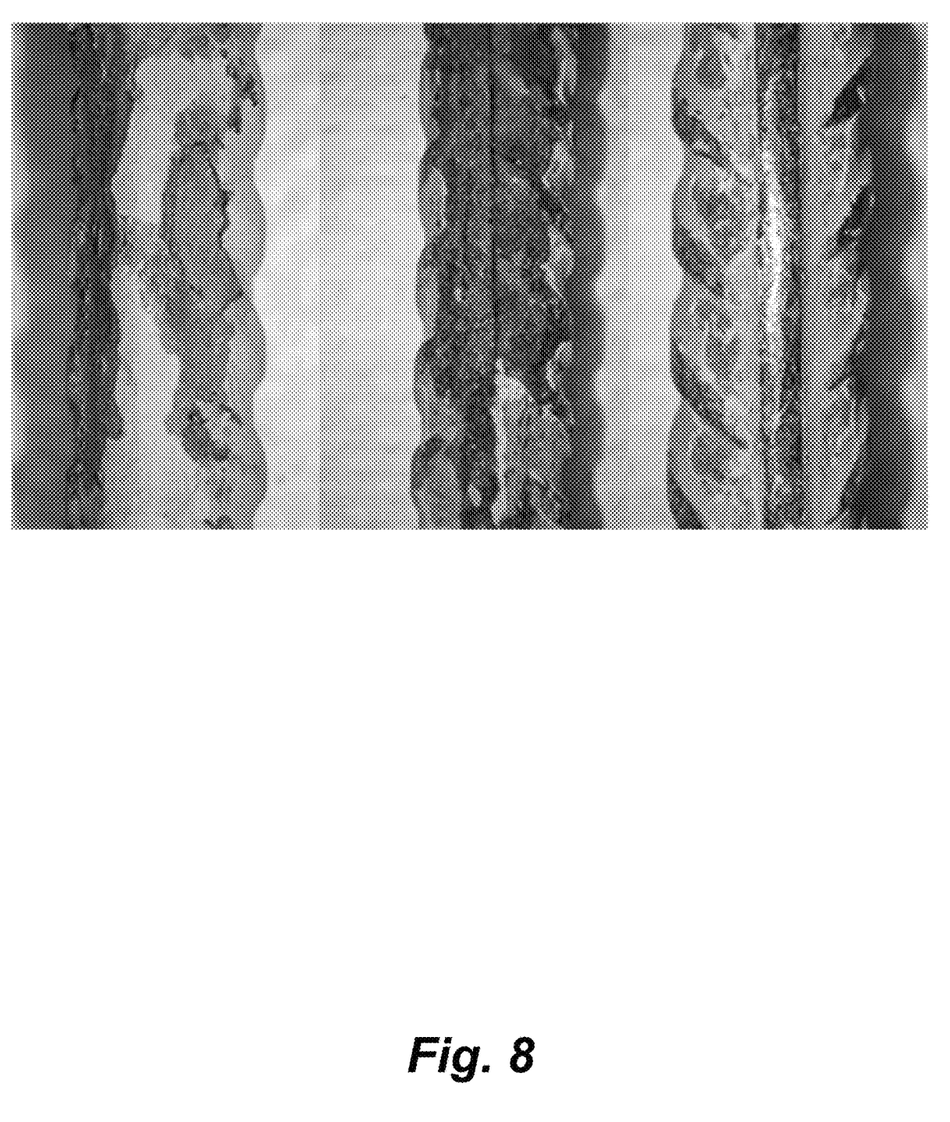
FIG. 8 shows an object picture of the coated steel bars of Example 2 after electric current-accelerated corrosion for 48 h.

FIG. 8 shows an object picture of the coated steel bars Example 2 after electric current-accelerated corrosion for 48 h. The steel bar on the left is the appearance of the corroded portion of the coated steel bar in Example 2 before the coating is removed, and the steel bar in the middle is the appearance of the steel bar after the coating is removed. It is observed that some damage has occurred to the coating at the location where the rust product has generated, and slight corrosion has occurred on the surface of the steel bars, but the degree of corrosion is still relatively light compared with that of the uncoated steel bars. The figure on the right is the appearance of the uncorroded part of the coated steel bar in Example 2 after the steel bar coating is removed. This covered steel bar still maintains its original shape and metallic luster, indicating that it is not affected by the corrosion.

Figure 9:
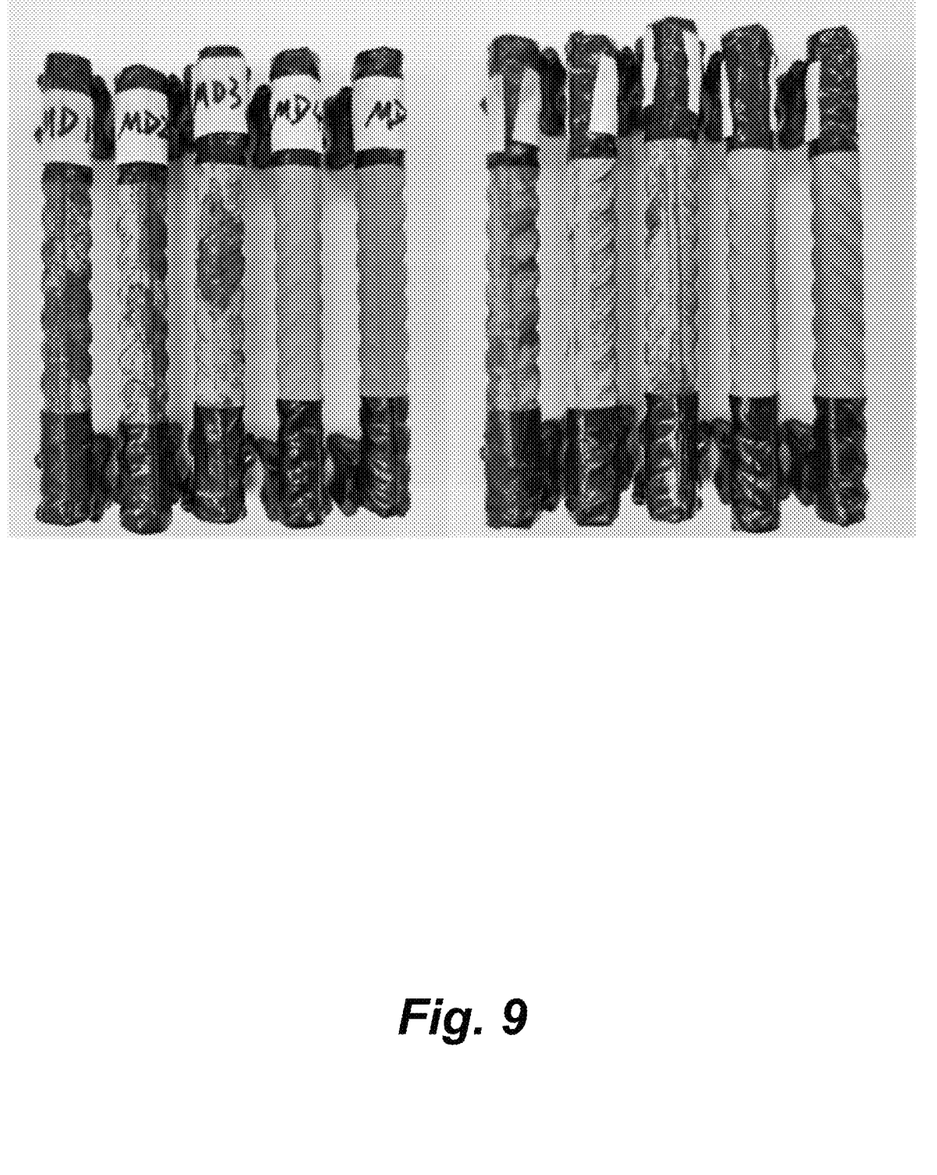
FIG. 9 shows a comparative object picture of the front and back sides of the coated steel bars of Example 1 after the salt spray test for 14 days.
Figure 10:
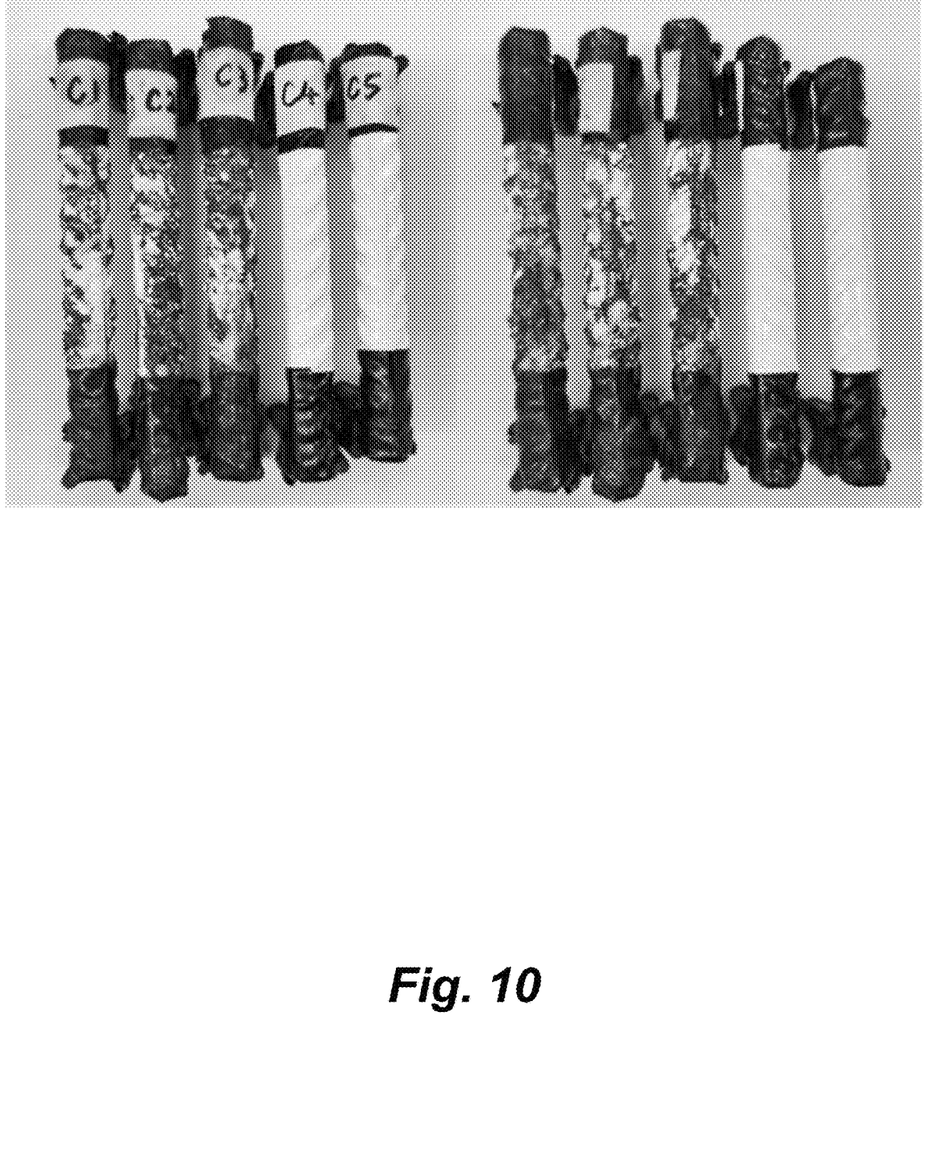
FIG. 10 shows a comparative object picture of the front and back sides of the commercially-available water-based metal paint-coated steel bars after the salt spray test for 14 days.
Figure 11:
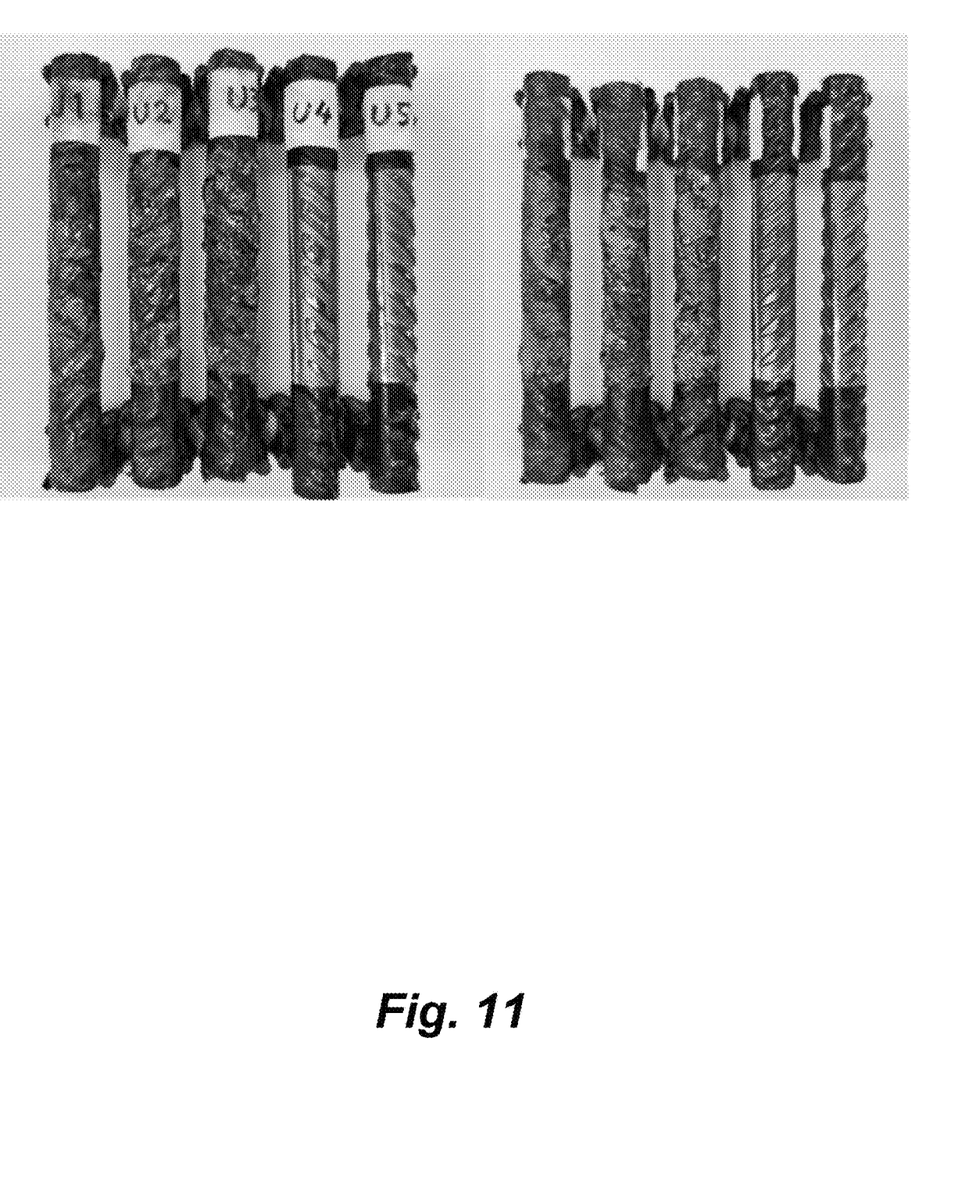
FIG. 11 shows a comparative object picture of the front and back sides of the uncoated steel bars after the salt spray test for 14 days.

FIG. 9 to FIG. 11 show the salt spray test of the coated steel bars and the uncoated steel bars with reference to GB/T 10125-2012 "Corrosion tests in artificial atmospheres—Salt spray tests". A salt spray box was at 35° C., a mass concentration of sodium chloride used to generate salt spray was 5%, the spray was conducted by intermittent spraying by spraying for 8 h combined with resting for 16 h, and the test time was 14 days. The preparation method of the commercially-available water-based metal paint-coated steel bars was the same as the preparation method of the coated steel bars in Example 1.

FIG. 9 shows a comparative object picture of the front and back sides of the coated steel bars in Example 1 after the salt spray test for 14 days, wherein the three samples on the left are salt spray test samples, while the two samples on the right are control samples (the same batch of samples that are not subjected to the salt spray test).

FIG. 10 shows a comparative object picture of the front and back sides of the commercially-available water-based metal paint-coated steel bars after the salt spray test for 14 days, wherein the three samples on the left are salt spray test samples, while the two samples on the right are control samples.

FIG. 11 shows a comparative object picture of the front and back sides of the uncoated steel bars after the salt spray test for 14 days, wherein the three samples on the left are salt spray test samples, while the two samples on the right are control samples.

The salt spray test results show that in the same test environment: severe corrosion occurred on the surface of the uncoated steel bars, and the exposed test surface of the steel bars is wrapped by reddish-brown corrosion products. The steel bars coated with the commercially-available water-based metal anti-rust paint coating also corroded, and blistering and rust on the surface of the coating indicated that the coating had deteriorated. The coated steel bars in Example 1 also rust in this test environment, but they have a relatively light degree of rusting, and less rust products are generated on the surface while some unaffected areas are still maintained. These results show that the coating of Example 1 has a desirable protective effect on the steel bars.

Although the above examples have described the present disclosure in detail, they are only a part of, not all of, the embodiments of the present disclosure. Other embodiments may also be obtained by persons based on the examples without creative efforts, and all of these embodiments shall fall within the scope of the present disclosure.

What is claimed is:
1. An alkali-activated geopolymer coating, prepared by raw materials consisting of the following components: an aluminosilicate mineral, an alkali activator, and a performance additive;
   wherein the aluminosilicate mineral is consisted of fly ash, slag, and metakaolin;
   the performance additive is consisted of a polymer powder, titanium dioxide, a silicone defoamer, and a water-reducing admixture;
   a mass ratio of the aluminosilicate mineral, the alkali activator, and the performance additive is in a range of 100:(60-80):(4-15);
   a mass ratio of the fly ash, the slag, and the metakaolin in the aluminosilicate mineral is in a range of (40-60):(20-40):(10-30);
   a mass ratio of the polymer powder to the aluminosilicate mineral is in a range of (1-5):100; and
   a mass ratio of the titanium dioxide to the aluminosilicate mineral is in a range of (3-8):100.

2. The alkali-activated geopolymer coating of claim 1, wherein an amount of the silicone defoamer accounts for 0.1% to 0.3% of a total mass of the aluminosilicate mineral and the alkali activator.

3. The alkali-activated geopolymer coating according to claim 1, wherein a mass ratio of the water-reducing admixture to the aluminosilicate mineral is in a range of (0.5-1):100.

4. The alkali-activated geopolymer coating of claim 1, wherein the alkali activator is prepared from sodium silicate, sodium hydroxide, and water.

5. The alkali-activated geopolymer coating of claim 1, wherein the alkali activator has a modulus of 1.0 to 2.0.

6. A method for preparing the alkali-activated geopolymer coating of claim 1, comprising:
   mixing the fly ash, the slag, the metakaolin, the polymer powder, and the titanium dioxide to obtain a mixed powder; and
   mixing the mixed powder, the alkali activator, and the silicone defoamer to obtain a mixture, and then mixing the mixture with the water-reducing admixture to obtain the alkali-activated geopolymer coating.

7. The geopolymer coating of claim 4, wherein the alkali activator has a modulus of 1.0 to 2.0.

8. The method of claim 6, wherein an amount of the silicone defoamer accounts for 0.1% to 0.3% of a total mass of the aluminosilicate mineral and the alkali activator.

9. The method of claim 6, wherein a mass ratio of the water-reducing admixture to the aluminosilicate mineral is in a range of (0.5-1):100.

10. The method of claim 6, wherein the alkali activator is prepared from sodium silicate, sodium hydroxide, and water.

11. The method of claim 6, wherein the alkali activator has a modulus of 1.0 to 2.0.

* * * * *